United States Patent [19]

Pitchon

[11] 4,225,630

[45] Sep. 30, 1980

[54] FOOD EXTRUSION PROCESS

[75] Inventor: Esra Pitchon, Flushing, N.Y.

[73] Assignee: General Foods Company, White Plains, N.Y.

[21] Appl. No.: 909,075

[22] Filed: May 24, 1978

[51] Int. Cl.² ............................................. C23K 1/00
[52] U.S. Cl. ................................. 426/623; 426/307; 426/619; 426/620; 426/805
[58] Field of Search ............... 426/805, 302, 307, 619, 426/620, 630, 623, 601, 802

[56] References Cited

U.S. PATENT DOCUMENTS

| 3,119,691 | 1/1964 | Ludington | 426/302 |
| 3,623,885 | 11/1971 | Hamdy | 426/802 |
| 4,143,169 | 3/1979 | Skoch et al. | 426/307 |

Primary Examiner—R. B. Penland
Attorney, Agent, or Firm—Mitchell E. Alter

[57] ABSTRACT

Disclosed is a method for adding fat to an expanded, farinaceous food product. The fat is injected into a food extruder in a manner which permits it to become intimately mixed with the food but does not interfere with product cooking or expansion. The foods may be for human or animal consumption. In a preferred embodiment, a high caloric density puppy food is prepared.

7 Claims, 1 Drawing Figure

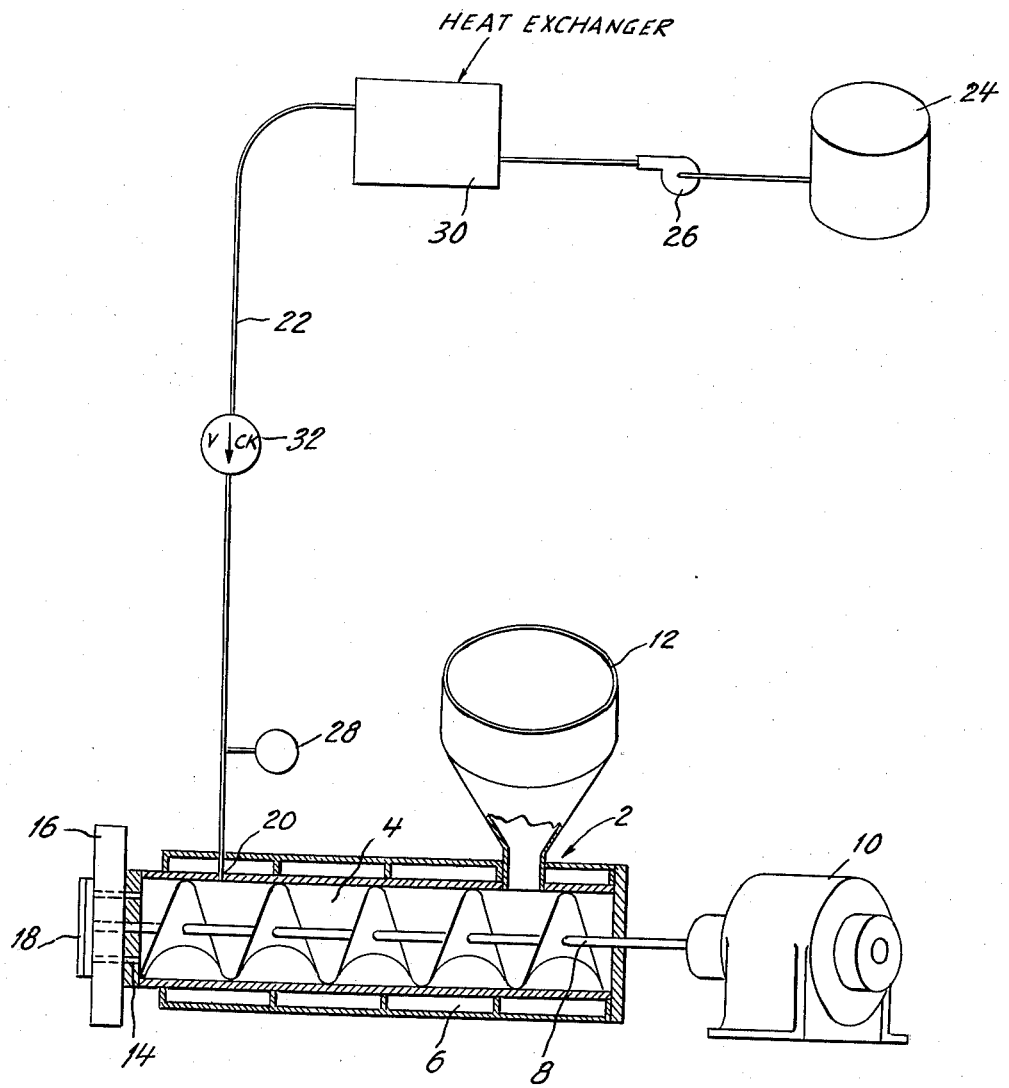

FOOD EXTRUSION PROCESS

BACKGROUND OF THE INVENTION

The present invention relates to the field of food extrusion, and more particularly deals with a process for improving the manner in which fat can be added to an extrusion-expanded food product.

Fat is an important dietary component and can also provide taste and textural variations to food products depending upon the type and/or the manner of addition. It has about twice the caloric density of protein and carbohydrates and is therefore a good source of calories. Many fats are also very taste attractive as food additives.

Foods intended for physically active humans and animals will desirably have high caloric contents. One class of foods where a high caloric density is particularly important is that especially formulated to meet the nutritional requirements of puppies. Because fat is a concentrated source of calories and is well liked by puppies, it would be desirable to increase the caloric density of conventionally formulated dog foods by simply adding more fat. Unfortunately, the addition of fat to an extruder-expanded farinaceous pet food beyond a level of 6 or 8% is fraught with difficulties.

Typically, expanded dog foods are prapared from a farinaceous mixture containing starch, protein, fat, and preferably also flavors colors, fiber and vitamins and minerals. Sufficient water is added to the farinaceous mixture to increase the moisture content to from about 20 to 35%. The mixture is then subjected to heat and pressure and expanded from an extruder. Upon extrusion, some of the water is flashed off causing expansion and partial drying of the product. The extrudate is cut into kibs upon exiting the extruder. Additional drying in an oven further reduces the moisture content to around 8 to 10%.

Conventionally, the fat content of the dog food kibs produced in this manner is increased to the desired level by surface coating with a fat such as tallow. Unfortunately, the addition of levels of tallow of over about 6 to 8% in this manner causes serious problems of product clumping and packaging material staining. These problems can be controlled only with significant expenditures. Where it has been attempted to add the higher amounts of fat directly to the farinaceous mixture prior to extrusion, product expansion has been reduced to an undesirable extent such that the products become undesirably dense. Accordingly, there is a present need to develop an improved process for providing higher levels of added fat in extrusion-expanded pet foods.

Fat coatings and high fat contents can also be useful for a number of purposes in foods intended for human consumption, such as ready-to-eat dry breakfast cereals. For example, as with the puppy food described above, there is a need for high energy content breakfast foods for human consumption. Moreover, the use of fat coatings on cereals has, in various applications, been shown to provide increased stability to oxidation of the natural fat content of the cereal and has also been employed as a coating to reduce the rate of hydration of the cereals when employed in milk. The addition of added fat directly to the extruder in preparing products of this type has caused excessive extruder surging as well as decreased product expansion. Here again, there is a present need for providing an improved process for adding fat to an extrusion-expanded, ready-to-eat breakfast cereal.

SUMMARY OF THE INVENTION

The present invention provides an improvement in a process for preparing an expanded, farinaceous food by an otherwise conventional extrusion process which includes moistening, heating and mechanically working a farinaceous mixture sufficiently to raise the temperature to substantially above 100° C., raise the pressure to in excess of ambient, and gelatinize starch granules, and thereafter extruding the farinaceous mixture containing gelatinized starch through a die into a zone maintained at a pressure sufficiently below that of the heated and worked mixture to cause expansion and partial drying of the mixture. The improvement of the invention comprises injecting fat into the farinaceous mixture at a point after substantial gelatinization of the starch but prior to extrusion through the die.

In a preferred embodiment, the fat is injected into the metering zone of a conventional food extruder. By injecting the fat into this section the necessary friction for properly working the farinaceous mixture is developed despite the presence of the fat within the mixture. This enables incorporation of the fat without the loss of subsequent expansion to achieve the desired low product density. The resulting products have improved rehydration characteristics, unique texture and exhibit reduced problems of high fat levels on the surface of the product. Moreover, the addition of fat after substantial gelatinization has occured reduces the problems of poor degree of expansion and product surging experienced where the fat is simply blended with the starting materials.

BRIEF SUMMARY OF THE DRAWINGS

The invention will become more apparent from the following detailed description, especially when read in light of the drawing wherein:

The FIGURE shows a schematic representation of a preferred apparatus for carrying out the process of this invention.

DETAILED DESCRIPTION OF THE INVENTION

The improvement provided by the present invention is applicable to food products prepared for both human and animal consumption. Typical of the food products which can be prepared are extrusion-expanded ready-to-eat breakfast cereals such as those described in U.S. Pat. Nos. 3,117,006 and 3,458,321, and extrusion-expanded dry pet foods such as those described in U.S. Pat. No. 3,119,691. In both cases, the products will be prepared by extrusion of a farinaceous mixture from a zone of high temperature and high pressure to a zone of relatively lower pressure whereby the farinaceous mixture expands and partially dries by virtue of the flashing of moisture upon being expressed from the extrusion die. The extruded mixture expands in the form of a continuous rope. This rope is cut, as by means of a constantly rotating fly knife mounted on a shaft which is coaxial with the shaft of the extruder screw. The knife is rotated at a frequency desired to cut off particles of the desired size.

In the case of conventional ready-to-eat breakfast food cereal products. the farinaceous mixture will consist essentially of grains such as wheat, corn, oats, and the like. There is usually no significant amount of added proteinaceous materials, however, this is certainly possible and within the scope of the present invention. There are cereal products known which can include relatively high amounts of proteinaceous materials, however, they are not commercially popular because of poor consumer acceptance of these products which have a somewhat unusual texture and taste from those normally associated with products of this type. The pet foods, on the other hand, will normally contain an added proteinaceous material. Both types of products will also typically include colorings, flavorings, and nutritional ingredients such as vitamins and minerals.

The application of the present invention to both types of products is essentially the same. Accordingly, for the sake of conciseness, the present description will focus on the preparation of a dry, extruder-expanded pet food. It is to be understood, however, that the techniques employed and described below in specific detail can be easily translated by one of ordinary skill in the art to the preparation of expanded ready-to-eat breakfast cereal products.

The dry, particulate, porous, expanded animal food products of this invention comprise a farinaceous mixture which is preferably formed of at least one farinaceous and at least one proteinaceous ingredient which have an increased fat content due to the injection of fat into the extruder during extrusion.

The farinaceous ingredients employed in forming products of this type may be wheat, corn, barley, oats, their derivatives such as corn meal, hominy, wheat middlings, and other like ingredients. Typically, the total amount of farinaceous ingredients based on the total weight of the farinaceous mixture is between 35% to 70% by weight.

The proteinaceous ingredients used in the mixture may be a vegetable, animal or fish origin and typically comprise soybean meal, soy grits, meat meal or fish scrap. Typically, the proteinaceous ingredients comprise from about 20% to 50% by weight of the total mixture.

The balance of the mixture may comprise salts, flavorings, colorings, vitamin supplements and other like ingredients to form a nutritionally-balanced animal food product.

In preparing the animal food kibs according to this invention, the above-recited materials are mixed together and mechanically worked under elevated temperatures and pressures, generally in an extruder apparatus of conventional design such as shown as 2 in the Figure, to form an expanded, porous product. While the use of conventional extruding equipment, such as those sold as Anderson expanders and Wenger cooker-extruders, are the preferred type of processing equipment presently contemplated, it is fully within the intention of the present invention to use any apparatus capable of mechanically working a farinaceous mixture of the type described under elevated heat and pressure and forcing it from a zone under these conditions into a zone of reduced pressure through a die orifice to allow expansion of the mixture.

Typically, the temperatures in the extruding zone 4 are maintained at temperatures above 100° C. by steam, water, or other heat transfer medium supplied to jacket 6, as well as steam or water supplied to the extruding zone 4 and the mechanical work supplied by the screw 8 which drives material through the extruder as it is turned by motor 10. The residence time of the mixture in the extruding zone, from the time it is fed into the zone at the feed end supplied by hopper 12 until exiting the extruder, is relatively short and generally on the order of 15 seconds to 120 seconds. The mixture exits the extrusion zone, through one or more die orifices 14 in die plate 16, to the atmosphere or other zone of substantially reduced pressure through a die orifice. As the material issues from the die, it expands into a porous, expanded product due to the pressure drop across the die and the flashing off of water as steam. The extrudate, typically in the form of a rope, has a moisture content of from about 20 to 35% by weight and is then cut into the desired kib size as by rotatably mounted fly knife 18. The kibbled product is dried to a stable moisture content generally about 10% and lower.

While it is not considered necessary to achieve the objects of the present invention, it may be desirable, depending upon the particular type of extruder employed and the operating conditions decided upon, to employ a pre-conditioning unit which by the use of stream and/or water and a heated jacket raises the temperature and the moisture content of the farinaceous mixture prior to passage into the extrusion zone. The net effect of this treatment is to decrease the time necessary for the working of the material in the extrusion zone. As will be pointed out in detail later, it is important that the starch in the farinaceous material be substantially gelatinized prior to injection of the fat into the material to assure complete expansion of the product. Thus, where the addition of fat into the extruder would decrease the degree of expansion to an undesirably low level, the addition of a pre-conditioning unit prior to the extruder can correct the problem and provide a better degree of cooking of the farinaceous mixture prior to fat injection.

The last stage in conventional food extruders right before the die orifice is referred to typically as the metering zone. When the material reaches this zone, it has been subjected to heat and mechanical action sufficient to, in most cases, substantially gelatinize the starch present in the product. By "substantially gelatinize" it is meant at least a majority of the starch granules within the mixture have lost their birefringence by being heated in the presence of moisture. Without substantial gelatinization of the starch, the product will not properly expand and will not be properly cohesive. It is therefore essential to the present invention that the fat not be injected into the farinaceous material prior to the point where the material has been worked sufficiently and is under the proper heat and pressure to permit the formation of a cohesive, expanded structure upon being extruded from the die. Thus, injection of fat into the extruder in what is typically known as the metering zone, typically the last extruder stage directly before the die plate, will allow the fat to be intimately mixed with the material as it is extruded and will not interfere with the product expansion or cohesiveness in any significant degree. Moreover, it has been noted in practice, that the slight degree of reduction in friction within the extruder which is attributable to the addition of the fat in this last extruder stage actually improves the efficiency of operation of the extruder. That is, the extruder will produce more material for a given amount of power consumption than in the absence of the material. Additionally, where the fat is hot as injected or where it is added sufficiently before extrusion so that it has time to heat up, the ultimate product will have a deep fat fried character which is highly desirable in some situations.

The major concerns as far as design of the particular equipment to inject the fat are: simplicity, accuracy of fat delivery, reliability, and flexibility to enable the variation and proper control of fat levels and types. The extruder will be fitted with at least one orifice, shown in the drawing at 20, and preferably a plurality of orifices located circumferentially around the barrel of the extruded extruder for passing the fat into the interior of the barrel. The orifice or orifices are preferably fed by a line 22 from a common source 24 fed by suitable pump 26 with an accurate metering device 28 to deliver the exact amount of material required in a controllable manner. Desirably, the control for feeding fat into the extruder should be made dependent upon the feed rate of farinaceous material into the extruder by known control mechanisms. If the fat is not normally liquid or, if otherwise desired, the fat can be heated prior to being passed into the extruder. This heating can be accomplished by any conventional heat exchanger 30 in a continuous or batch procedure. When operating at high temperatures, e.g., on the order of 175° C., it is preferred to heat the fat as rapidly as possible, shortly before inlet into the extruder. Thus, an electric heater is preferably employed. A check valve 32 or other similar device is preferably set to prevent unprogrammed backflow of fat or product through supply line 22.

The type of fat to be added is not of any criticality with regard to the operation of the present invention. However, there are particular types of fats which are preferred for various end use situations. Typically, bleachable fancy tallow will be employed as the fat in preparing a product intended for dog food usage. On the other hand, Konut brand coconut oil, has been employed in ready-to-eat breakfast cereals. Products intended for use as cat foods can contain desirable amounts of lard or chicken fat to make them suitably attractive. If desired, these fats can be blended.

The fat added by the process of this invention can be a portion or all of the fat added. Thus, it is not necessary to add all of the fat by injection; but, some can be added by injection and some can be added by coating and/or preblending. The process is preferably employed to add amounts of over 2%, and more preferably over 4%, based on the dry weight of the product. The invention is especially important where it is desired to obtain added fat levels of 6 to 10%, where all of this can be added by injection if desired. It will be understood that higher and lower levels can also be achieved where desired.

The following examples are presented for the purpose of further describing and explaining the present invention and are not to be taken as limiting in any regard. Unless otherwise indicated, all parts and percentages are by weight.

EXAMPLE I

A dry, expanded pet food is prepared by injecting fat into an Anderson expander having a 4" diameter and a 45" length barrel. A farinaceous mixture having the following formulation:

| | |
|---|---|
| Whole ground corn | 40% |
| Soybean oil meal | 20% |
| Meat and bone meal | 11% |
| Wheat middlings | 22% |
| Vitamins, minerals, etc. | 3% | was fed into the extruder at 3200 grams per minute with the moisture content being raised to a level of about 25% by weight. The extruder jackets were heated to a temperature of about 180° C. Arranged about three inches from the discharge end of the extruder was a port for injecting fat. Hot tallow at about 95° C. was injected into the extruder through this port. Three different oil levels were tested, they are: 150 cc per minute, 225 cc per minute and 300 cc per minute. The lower level of fat injection showed a highly desirable degree of expansion which continued to be good but decreased at the higher levels. In each case, the product was dried to a moisture content of about 8 to 10%.

EXAMPLE II

The process of Example I was repeated but this time employing pre-heated bleachable fancy tallow at 175° C. and 205° C. The oil feed rate was tested at levels of 2.5, 5.0 and 10% by holding the product feed rate constant and adjusting the oil feed rate. The hot fat was introduced into the extruder close to the die orifice in the compression zone of the extruder. All of the products were then dried at 150° C. for approximately 12 minutes.

EXAMPLE III

The basic formulation employed in Example I is employed again here to show the difference between samples having fat added according to the present invention as compared to surface coating a finished product with the same amount of fat or pre-blending the same amount of fat with the farinaceous mixture prior to extrusion. Thus, the only variations in the process as described in Example I are the manner of adding the fat and the temperature of the fat which was 175°–190° C. in the case of injection.

The following samples were run:
1. Control—no fat addition in process but surface coated with 5% fat
2. Control—no fat addition in process but surface coated with 10% fat
3. 5% BFT blended into dry mix
4. 5% BFT injected into expander
5. 10% BFT blended into dry mix
6. 10% BFT injected into expander All runs were made using the same feed rate, water addition level, and steam settings. Product density (expansion) was maintained with the injection samples but not with the blended samples. The energy requirement for the injected samples was less than control while still providing good expansion. The energy requirement for the blended samples was lowest, but expansion was also the poorest. The rehydration test is run by placing 100 grams of sample in 200 grams of water at 100° F., and letting the sample sit for three minutes after which the water is drained and the sample is weighed. The results are summarized in Table I.

TABLE I

| | 5% Control | 10% Control | 5% Blended | 5% Injection | 10% Blended | 10% Injection |
|---|---|---|---|---|---|---|
| % Motor Load | 43 | 43 | 38 | 42 | 34 | 41 |
| Density Out of Expander lb./ft.$^3$ | 28/32 | 28/32 | 33 | 27.5 | 36 | 29.5 |
| Density-Dry lb./ft.$^3$ | 27.5 | 27.5 | 29.5 | 25 | 29 | 24.5 |
| Fat Temperature °F. | — | — | — | 350–375 | — | 350–375 |
| Moisture-Out of Expander % | 28 | 28 | 28.5 | 28.4 | 29 | 23.8 |
| Rehydration gm. H$_2$O/100 gm. Product | 34.7 | 18 | 39.5 | 66 | 41.4 | 87 |

These samples were tested for textural properties both dry and rehydrated. The dog food was rehydrated by placing one kib in ¼ cup 100° F. water for three minutes. The initial firmness and force to first observable fracture were tested on an Instron Universal Testing Machine fitted with a 200 pound compression load cell. The machine settings are summarized in Table II:

Table II

| Instrument Conditions | |
|---|---|
| Instron | |
| Plunger diameter | 57 mm |
| Chart speed | 20"/min. |
| Crosshead speed | 1"/min. |
| Clearance | zero |
| Full Scale Load | 20 and 50 lb. |
| Calibration | 5 lb. to 100 lb. |
| Number of replicates | 2–3 |
| Sample presentation | one kib |
| Sample size | 20 × 13 × 10 mm |

The results are summarized in Table III which also shows the sample weight tested and the dry density of that sample. The obtained results indicate:
1. The kibs prepared by blending fat were the firmest and least fracturable both before and after rehydration due to decreased expansion.
2. The fat injected kibs absorbed more water than the blended fat kibs at the same added fat level, but yet had initial firmness and force to first fracture values after rehydration which were closest to control.
3. The fat injected kibs had initial firmness values closer to control for both the 5% and 10% level of added fat, both dry and rehydrated.

TABLE III

| Test | Control 5% Coated Dry | Control 5% Coated Rehyd | 5% Blended Dry | 5% Blended Rehyd | 5% Injected Dry | 5% Injected Rehyd | 10% Blended Dry | 10% Blended Rehyd | 10% Injected Dry | 10% Injected Rehyd |
|---|---|---|---|---|---|---|---|---|---|---|
| Weight (g) | 1.51 | 2.33 | 1.72 | 2.64 | 1.67 | 2.67 | 1.76 | 2.51 | 1.77 | 3.13 |
| Density (g/cc) | 27.5 | | 29.5 | | 25 | | 29 | | 24.5 | |
| Initial Firmness (lb/mm) | 16.5 | 4.2 | 43.5 | 10.5 | 20.0 | 4.4 | 32.9 | 17.3 | 14.6 | 5.1 |
| Force to First Fracture (lb) | 25.3 | 7.4 | 25.1 | 13.2 | 12.8 | 7.6 | 17.1 | 16.4 | 8.2 | 8.5 |

EXAMPLE IV

This example describes the preparation of a dry, ready-to-eat crinkled rice cereal for human consumption by the process of this invention. The product was made on a Wenger X20 cooker-extruder from the following materials:

| | |
|---|---|
| Rice Flour | 56.550% |
| Corn | 39.975% |
| Salt | .975% |
| Sugar | 2.500% |

The fat was Konut brand coconut oil which was injected at the 3% and 5% levels at around 200° to 250° F. There was some surging but nothing compared to previous runs when the fat was mixed directly into the flour blend and then run through the expander. Sample seemed to blister better than samples run without fat injection which makes it look more like conventionally produced product. The fat treated product of this type thus had added fat and did not have significant adverse impact on other desirable product attributes.

The above description is for the purpose of teaching those skilled in the art how to practice the present invention and is not intended to teach all those modifications and variations which will become apparent to the person of ordinary skill in the art upon reading the description. It is intended, however, that all such obvious modifications and variations be included within the scope of the invention which is defined by the following claims.

What is claimed is:

1. In a process for preparing an expanded, farinaceous food by moistening, heating and mechanically working a farinaceous mixture, comprising 35–70% farinaceous ingredients and 20–50% protein ingredients sufficiently to raise the temperature to substantially above 100° C., raise the pressure in excess of ambient, and to gelatinize starch granules; and thereafter extruding the farinaceous mixture containing gelatinized starch through a die into a zone maintained at a pressure sufficiently below that of the heated and worked mixture to cause expansion and partial drying of the mixture, the improvement which comprises: injecting at least 2% fat into the farinaceous mixture at a point after substantial gelatinization of the starch but prior to extrusion through the die which permits the fat to become intimately mixed with the food.

2. An improved process according to claim 1 wherein the fat is injected in an amount effective to add at least 4% fat to the final product based on the weight of the dry product.

3. An improved process according to claim 1 wherein the fat is heated to a temperature of at least 175° C. prior to injection to produce a deep fat fried flavor and appearance in the food.

4. An improved process according to claim 1 wherein the food product is a ready-to-eat breakfast food for human consumption.

5. An improved process according to claim 1 wherein the dog food product is especially formulated to meet the nutritional requirements of puppies and the fat is injected in an amount effective to add from 4 to 10% fat based on the dry weight of the final product.

6. A process according to claim 5 wherein the fat is tallow and the process includes the further step of heating the tallow to a temperature effective to liquify it prior to injection.

7. A process according to claim 1 wherein the food is a nutritionally-balanced cat food.

* * * * *

UNITED STATES PATENT OFFICE
CERTIFICATE OF CORRECTION

Patent No. 4,225,630          Dated  Sep. 30, 1980

Inventor(s)     Esra Pitchon

It is certified that error appears in the above-identified patent and that said Letters Patent are hereby corrected as shown below:

In Col. 2 line 66 change "." to --,--
In Col. 7 line 26 change "57 mm" to --56 mm--

Signed and Sealed this

Thirty-first Day of March 1981

[SEAL]

Attest:

RENE D. TEGTMEYER

*Attesting Officer*  *Acting Commissioner of Patents and Trademarks*